US010747618B2

(12) United States Patent
Hu et al.

(10) Patent No.: US 10,747,618 B2
(45) Date of Patent: *Aug. 18, 2020

(54) CHECKPOINTING OF METADATA INTO USER DATA AREA OF A CONTENT ADDRESSABLE STORAGE SYSTEM

(71) Applicant: EMC IP Holding Company LLC, Hopkinton, MA (US)

(72) Inventors: Ying Hu, Northborough, MA (US); Anton Kucherov, Dudley, MA (US); Zvi Schneider, Tel Aviv (IL); Xiangping Chen, Sherborn, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/202,831

(22) Filed: Nov. 28, 2018

(65) Prior Publication Data
US 2019/0095283 A1 Mar. 28, 2019

Related U.S. Application Data

(63) Continuation of application No. 15/637,613, filed on Jun. 29, 2017, now Pat. No. 10,176,046.

(51) Int. Cl.
*G06F 11/14* (2006.01)
*G06F 3/06* (2006.01)

(52) U.S. Cl.
CPC .......... *G06F 11/1407* (2013.01); *G06F 3/065* (2013.01); *G06F 3/067* (2013.01);
(Continued)

(58) Field of Classification Search
CPC ............. G06F 11/1407; G06F 11/1446; G06F 3/0619; G06F 3/065; G06F 3/067; G06F 3/0689
See application file for complete search history.

(56) References Cited

U.S. PATENT DOCUMENTS 6,513,093 B1 * 1/2003 Chen .................... G06F 3/0617
711/4
8,095,542 B1 * 1/2012 Teugels .................. G06F 16/13
707/747
(Continued)

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Ryan Bertram
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured to capture metadata from a metadata area of a storage system for checkpointing, and to store the captured metadata as checkpointed metadata in a user data area of the storage system in association with mapping information relating portions of the checkpointed metadata to particular storage locations in the user data area. The processing device in some embodiments is implemented within the storage system, and may comprise a storage controller of the storage system. The mapping information illustratively comprises a plurality of page location arrays each having a plurality of entries specifying respective locations of checkpointed metadata pages in the user data area. The mapping information may further comprise one or more array location arrays each indexed by a corresponding set of page location array identifiers specifying respective locations of page location arrays in the user data area.

20 Claims, 7 Drawing Sheets

(52) U.S. Cl.
CPC .......... *G06F 3/0619* (2013.01); *G06F 3/0689* (2013.01); *G06F 11/1446* (2013.01); *G06F 2201/84* (2013.01)

(56) References Cited

U.S. PATENT DOCUMENTS

| | | | |
|---|---|---|---|
| 8,880,787 B1 * | 11/2014 | Kimmel | G06F 12/0246 |
| | | | 711/103 |
| 8,904,006 B2 * | 12/2014 | Chang | G06F 16/128 |
| | | | 709/226 |
| 9,720,921 B1 | 8/2017 | Bhattacharyya et al. | |
| 9,830,228 B1 | 11/2017 | Chopra et al. | |
| 10,235,066 B1 * | 3/2019 | Chen | G06F 3/0619 |
| 10,402,283 B1 * | 9/2019 | Chen | G06F 11/1438 |
| 2004/0128470 A1 * | 7/2004 | Hetzler | G06F 12/0804 |
| | | | 711/209 |
| 2009/0132775 A1 * | 5/2009 | Otani | G06F 11/1456 |
| | | | 711/162 |
| 2012/0124282 A1 * | 5/2012 | Frank | G06F 3/061 |
| | | | 711/108 |
| 2013/0305002 A1 | 11/2013 | Hallak et al. | |
| 2014/0082261 A1 * | 3/2014 | Cohen | G11C 16/06 |
| | | | 711/103 |
| 2014/0189270 A1 * | 7/2014 | Iwanicki | G06F 3/0619 |
| | | | 711/162 |
| 2015/0331624 A1 * | 11/2015 | Law | G06F 12/10 |
| | | | 711/103 |
| 2016/0006829 A1 * | 1/2016 | Ishii | G06F 3/0605 |
| | | | 709/219 |
| 2016/0077926 A1 * | 3/2016 | Mutalik | G06F 11/1456 |
| | | | 711/162 |
| 2017/0323110 A1 | 11/2017 | Griffith et al. | |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

Itzikr, "DellEMC XtremIO X2/X1 Management, Part 1, The CAS Architecture= Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

* cited by examiner

502
Max_location_array_level = 3 //based on storage array capacity, maximum level is 3
Offset_size = 5
Page_size = 8192
Offsets_per_page = page_size / offset_size

504
Dump_one_hmd_metadata_page(metadata_page):
Offset = write_page(metadata_page)
Add offset to level 0 location array
For each offset_per_page entries at level i location array,
  Level_(i+1)_new_offset = write_page(a page contains offsets_per_page offsets)
  Add level_(i+1)_new_offset to level (i+1) location array

506
Read_one_hmd_metadata_page(page_index):
entry_index_at_level[0] = page_index
for each level from 1 to max_location_array_level – 1
  entry_index_at_level[i] = entry_index_at_level[i-1] / offsets_per_page
location_array_at_level [max_location_array_level -1] is ready from SYM.
for each level from max_location_array_level – 1 to 1
  location_array_at_level[i-1] = read_page(entry_index_at_level[i] from location_array_at_level[i])
hmd_page = read_page(entry_index_at_level[0] from location_array_at_level[0])

CHECKPOINTING OF METADATA INTO USER DATA AREA OF A CONTENT ADDRESSABLE STORAGE SYSTEM

RELATED APPLICATION(S)

The present application is a continuation of U.S. patent application Ser. No. 15/637,613, filed Jun. 29, 2017 and entitled "Checkpointing of Metadata into User Data Area of a Content Addressable Storage System," which is incorporated by reference herein in its entirety.

FIELD

The field relates generally to information processing systems, and more particularly to storage in information processing systems.

BACKGROUND

Storage systems are often configured to generate periodic checkpoints in order to capture the state of the system at corresponding points in time. Such a checkpointing arrangement allows the system state to be recovered from a previously-captured checkpoint in the event of a storage device failure or other issue arising at a later point in time. However, conventional checkpointing arrangements can be highly inefficient when capturing and recovering metadata in a content addressable storage system under certain conditions.

SUMMARY

Illustrative embodiments provide checkpointing of metadata into a user data area in a content addressable storage system. Such embodiments can advantageously provide significantly improved efficiency in checkpoint capture and recovery in a content addressable storage system in situations in which checkpointed metadata is stored in a user data area due to size limitations or other availability restrictions relating to a metadata area of the storage system. Similar advantages can be provided in other types of storage systems.

In one embodiment, an apparatus comprises at least one processing device comprising a processor coupled to a memory. The processing device is configured to capture metadata from a metadata area of a storage system for checkpointing, and to store the captured metadata as checkpointed metadata in a user data area of the storage system in association with mapping information relating portions of the checkpointed metadata to particular storage locations in the user data area.

The processing device in some embodiments is implemented within the storage system, and may comprise a storage controller of the storage system.

The mapping information illustratively comprises a plurality of page location arrays each having a plurality of entries specifying respective locations of checkpointed metadata pages in the user data area.

The mapping information may further comprise one or more array location arrays each indexed by a corresponding set of page location array identifiers specifying respective locations of page location arrays in the user data area.

The mapping information may still further comprise locations of respective ones of a plurality of the array location arrays in the user data area. For example, the locations of the respective ones of the array location arrays may be stored as part of a checkpoint object for the checkpoint in a system memory of the storage system.

Additionally or alternatively, one or more higher-level location arrays may be used to store the locations of the respective ones of the array location arrays. In an arrangement of this type, the page location arrays may be referred to as "level 0" arrays, the array location arrays may be referred to as "level 1" location arrays, and a given one of the higher-level location arrays used to store locations of respective ones of the array location arrays may be referred to as a "level 2" location array. One or more of the level 2 location arrays may be stored in the system memory as part of the above-noted checkpoint object.

In some embodiments, the storage system comprises a content addressable storage system and the metadata comprises hash metadata providing a mapping between content-based digests of respective pages of the user data and corresponding physical locations of the respective pages of the user data in the user data area.

The storage devices in some embodiments comprise non-volatile memory devices. For example, the storage devices in such embodiments can be configured to collectively provide an all-flash storage array.

Additionally or alternatively, the storage system may comprise a clustered storage system having a plurality of storage nodes each having a plurality of storage devices. For example, the storage controller may be implemented in a distributed manner so as to comprise a plurality of distributed storage controller components implemented on respective ones of the storage nodes of the clustered storage system. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 5 shows example pseudocode for storing and recovering checkpointed metadata in a user data area using level 0, level 1 and level 2 location arrays in a content addressable storage system in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
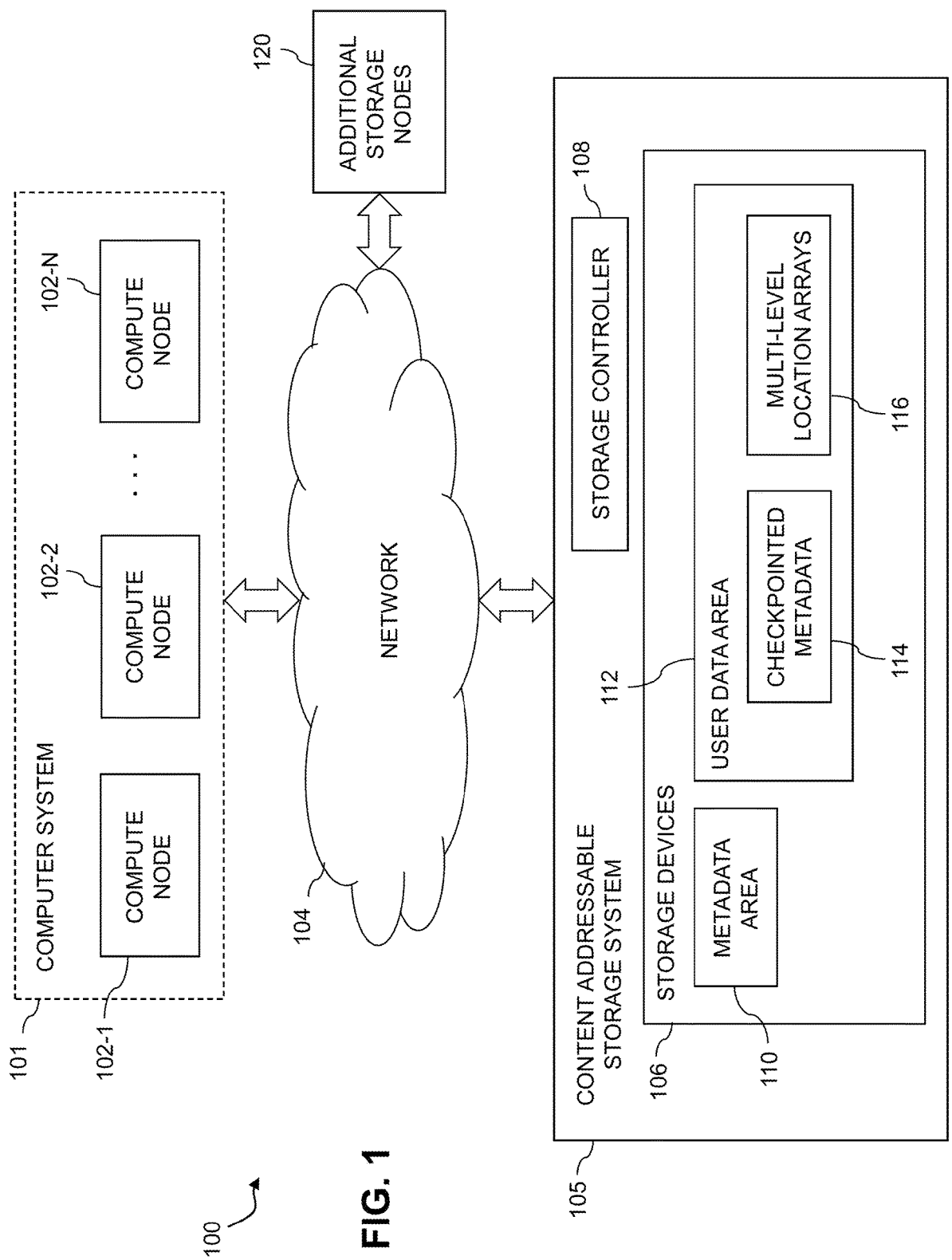
FIG. 1 is a block diagram of an information processing system comprising a content addressable storage system configured for generation of checkpoints including checkpointing of metadata into a user data area in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to provide a metadata area 110 and a user data area 112. It is assumed that the user data area 112 is separated into pages. The metadata area 110 may be similarly separated into pages.

A given "page" as the term is broadly used herein should not be viewed as being limited to any particular range of fixed sizes. In some embodiments, a page size of 8 kilobytes (KB) is used, but this is by way of example only and can be varied in other embodiments. Accordingly, illustrative embodiments can utilize any of a wide variety of alternative paging arrangements for organizing the metadata area 110 and the user data area 112.

The user data area 112 illustratively comprises a plurality of logical units (LUNs) configured to store files, blocks, objects or other arrangements of data on behalf of users associated with compute nodes 102. Each such LUN may comprise particular ones of the above-noted pages of the user data area 112. The user data stored in the user data area 112 can include any type of user data that may be utilized in the system 100. The term "user data" herein is therefore also intended to be broadly construed.

It is assumed in this illustrative embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective pages of user data and corresponding physical locations of the respective pages of the user data in the user data area 112. The hash metadata generated by the content addressable storage system 105 is illustratively stored in the metadata area 110.

The generation and storage of the hash metadata is assumed to be performed under the control of the storage controller 108. The hash metadata may be stored in the metadata area 110 in a plurality of entries corresponding to respective buckets each comprising multiple cache lines, although other arrangements can be used.

As indicated previously, conventional checkpointing arrangements can be highly inefficient when capturing and recovering metadata in a content addressable storage system under certain conditions. For example, it may be desirable to take periodic checkpoints of at least portions of the metadata stored in the metadata area 110. However, size limitations or other availability restrictions relating to the metadata area 110 may prevent such metadata checkpoints from being stored in the metadata area 110. Under these and other conditions, it may be necessary to store the checkpointed metadata in the user data area 112 as part of the checkpointed metadata 114.

The present embodiment is configured with multi-level location arrays 116 that overcome inefficiencies and other difficulties that would otherwise be associated with checkpointing of metadata into a user data area. For example, the pages of the user data area may have a fixed size on the order of kilobytes. This page size is typically multiple orders of magnitude less than a total size of the checkpointed metadata which may be on the order of gigabytes. In such an arrangement, it would be very difficult to track the locations of all of the pages of checkpointed metadata within the user data area, leading to inefficiencies not only in the checkpointing of the metadata but also in recovering the checkpointed metadata.

These and other issues are addressed in the present embodiment through the configuration and utilization of the multi-level location arrays 116 of the user data area 112. These location arrays are used to efficiently track the particular page locations of checkpointed metadata 114 within the user data area 112. As will be described in more detail below, such an embodiment can advantageously provide significantly improved efficiency in checkpoint capture and recovery in a content addressable storage system in situations in which checkpointed metadata is stored in a user data area due to size limitations or other availability restrictions relating to a metadata area of the storage system.

Figure 3:
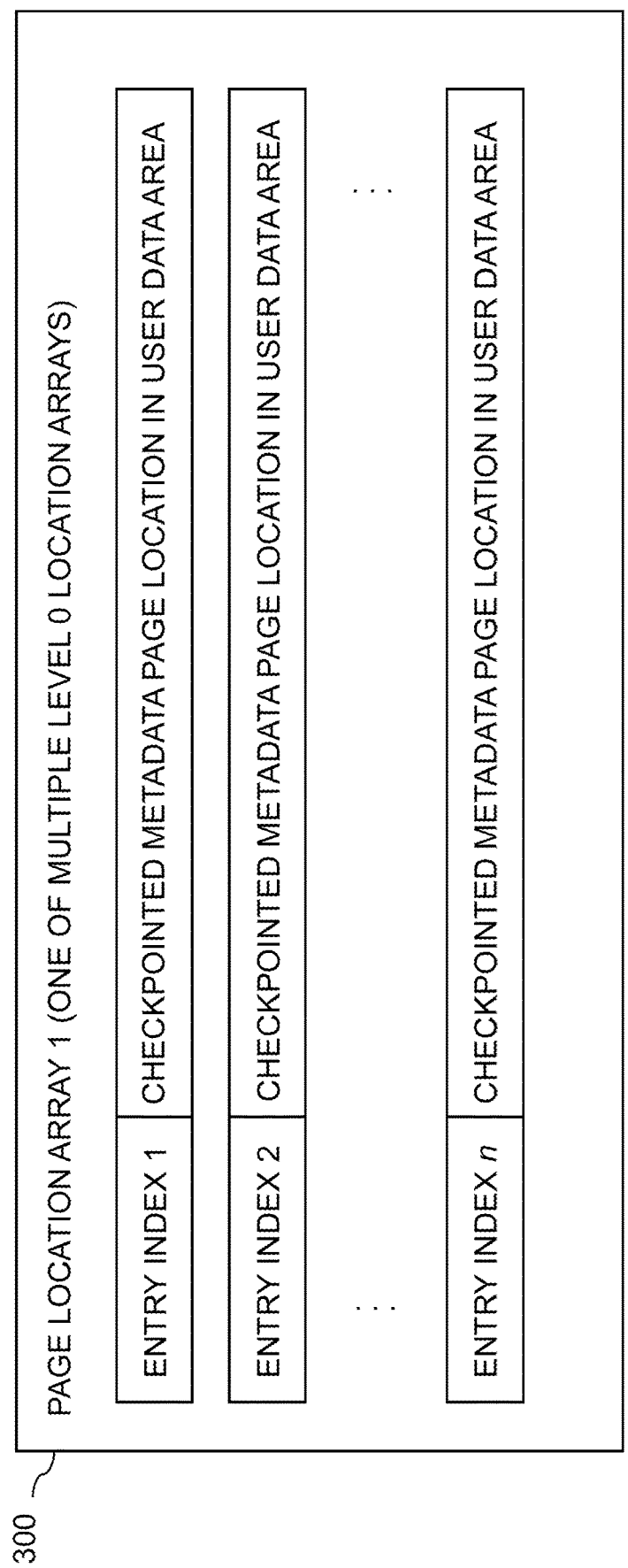
FIG. 3 shows an example of a page location array having a plurality of entries specifying respective locations of checkpointed metadata pages in a user data area in an illustrative embodiment.
Figure 4:
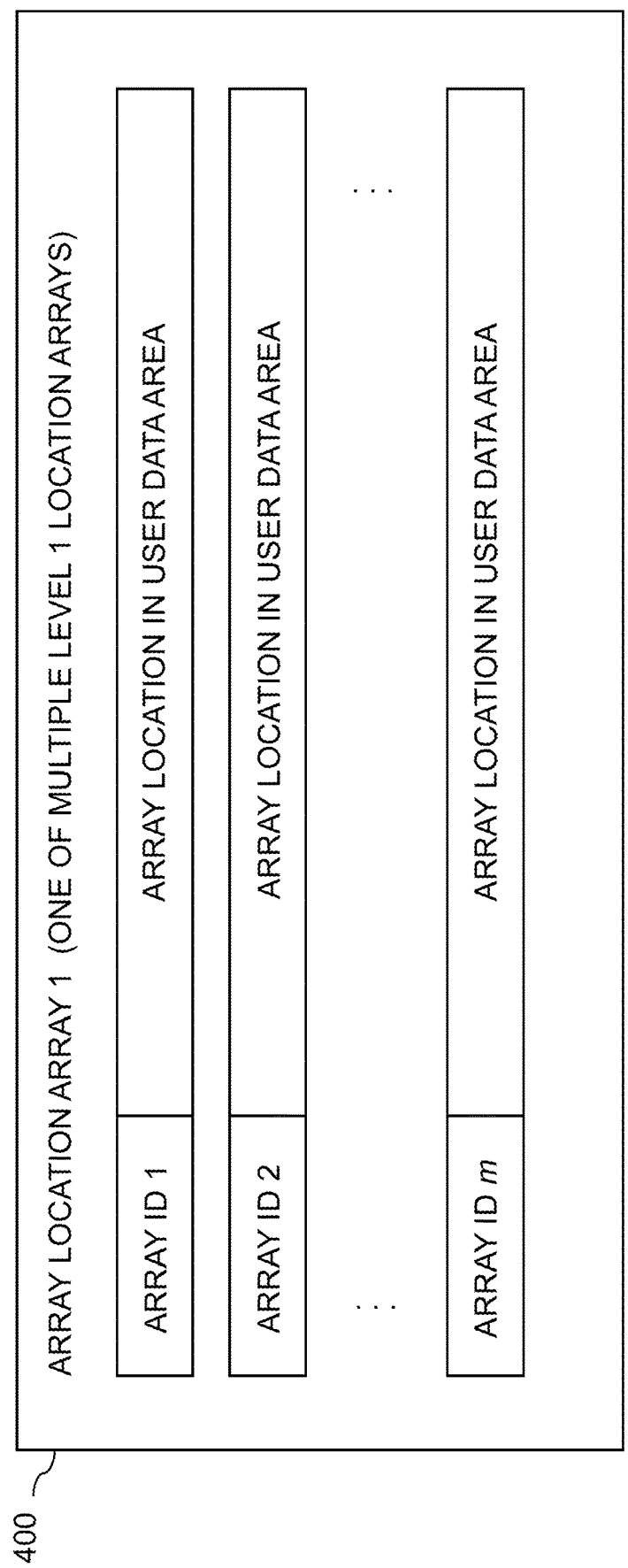
FIG. 4 shows an example of an array location array indexed by a corresponding set of page location array identifiers specifying respective locations of page location arrays in a user data area in an illustrative embodiment.

The multi-level location arrays 116 in the present embodiment are assumed to more particularly comprise a plurality of page location arrays each having a plurality of entries specifying respective locations of checkpointed metadata pages in the user data area 112, and one or more array location arrays each indexed by a corresponding set of page location array identifiers specifying respective locations of page location arrays in the user data area 112. Example configurations of a page location array and an array location array are shown in FIGS. 3 and 4, respectively.

The multi-level location arrays 116 may further comprise one or more higher-level location arrays used to store the locations of the respective ones of the array location arrays. In an arrangement of this type, the page location arrays may be referred to as "level 0" arrays, the array location arrays may be referred to as "level 1" location arrays, and a given one of the higher-level location arrays used to store locations of respective ones of the array location arrays may be referred to as a "level 2" location array. Example pseudo-code for storing and recovering checkpointed metadata using three different levels of location arrays will be described below in conjunction with FIG. 5.

The storage controller 108 of the FIG. 1 embodiment is configured to initiate generation of checkpoints in the content addressable storage system 105. This illustratively includes checkpointing of metadata stored in the metadata area 110. In conjunction with the generation of a given such checkpoint, the storage controller 108 causes checkpointed metadata from the metadata area 110 to be stored in the user data area 112. The storage controller 108 further stores mapping information relating portions of the checkpointed metadata 114 to respective pages of the user data area 112 that store those portions of the checkpointed metadata 114. This mapping information illustratively comprises the multi-level location arrays 116, including the plurality of page location arrays and the one or more array location arrays mentioned previously, and possibly one or more additional higher-level location arrays. Accordingly, the multi-level location arrays 116 collectively comprise one possible type of "mapping information" as that term is broadly used herein.

The mapping information can therefore specify locations of respective ones of a plurality of the array location arrays in the user data area 112. For example, the locations of the respective ones of the array location arrays can be stored in at least one of a checkpoint object for the given checkpoint in a system memory of the storage system. Such a system memory storing checkpoint objects may be separate from the storage devices 106. For example, the system memory may illustratively comprise a central database used for storage of critical metadata in the content addressable storage system 105.

Additionally or alternatively, the locations of the respective ones of the array location arrays can be stored using one or more higher-level location arrays as mentioned previously. For example, one or more such higher-level location arrays can be stored as part of the checkpoint object in the system memory.

The term SYM is used in some embodiments to denote a system-wide management module comprising or otherwise having access to the above-noted system memory for storage of critical metadata. The SYM may be part of the storage controller 108 or part of a given distributed component thereof in a distributed controller arrangement.

A given "checkpoint" as the term is broadly used herein can be an online system checkpoint or other type of checkpoint. It may be performed in accordance with a periodic checkpointing schedule or on demand, or under other conditions.

Further details regarding storage and retrieval of checkpointed metadata using the multi-level location arrays 116 will be described below in conjunction with FIGS. 2, 3 and 4.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

In one possible distributed implementation of a storage system, the storage system comprises a clustered storage system having a plurality of storage nodes each having a plurality of storage devices. The content addressable storage system 105 may represent a single storage node of such a clustered storage system. Alternatively, the content addressable storage system 105 may represent multiple storage nodes.

The system 100 as illustrated in FIG. 1 comprises additional storage nodes 120 that together with the content addressable storage system 105 form a clustered storage system. Each of the storage nodes of such a system may include separate instances of the storage controller 108, metadata area 110 and user data area 112.

It is also possible for the storage controller 108 to be implemented in a distributed manner so as to comprise a plurality of distributed storage controller components implemented on respective ones of the storage nodes of the clustered storage system.

Although illustratively shown as being implemented within the content addressable storage system 105, the storage controller 108 in other embodiments can be implemented at least in part within the computer system 101, in another system component, or as a stand-alone component coupled to the network 104.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108, metadata area 110 and user data area 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments a given content addressable storage system or other type of storage system with functionality for checkpointing of metadata in a user data area can be offered to cloud infrastructure customers or other users as a PaaS offering.

The operation of the information processing system 100 will now be described in further detail with reference to the flow diagram of the example embodiment of FIG. 2. The process as shown includes steps 200 through 204, and is suitable for use in the system 100 but is more generally applicable to other types of information processing systems comprising a content addressable storage system or other type of storage system.

In step 200, storage devices of a storage system are configured to provide a metadata area and a user data area, with the user data area being separated into pages.

In step 202, generation of a checkpoint is initiated in the storage system. It is assumed that the checkpoint to be generated involves checkpointing of at least a portion of the metadata of the storage system into a user data area of the storage system.

In step 204, checkpointed metadata from the metadata area is stored in the user data area, and mapping information relating portions of the checkpointed metadata to respective pages of the user data area that store those portions of the checkpointed metadata is also stored. The mapping information is illustratively also stored in the user data area, but in other embodiments could be stored in other parts of the storage system. The mapping information comprises a plurality of page location arrays each having a plurality of entries specifying respective locations of checkpointed metadata pages in the user data area, and one or more array location arrays each indexed by a corresponding set of page location array identifiers specifying respective locations of page location arrays in the user data area.

An example of a page location array 300 having a plurality of entries specifying respective locations of checkpointed metadata pages in the user data area is shown in FIG. 3. The page location array 300, also denoted as Page Location Array 1, is one of a plurality of "level 0" location arrays that are stored in conjunction with the checkpointing of pages of the metadata into respective locations in the user data area. The page location array 300 includes a plurality of entries, denoted by respective entry indexes Entry Index 1, Entry Index 2, . . . Entry Index n. These entries specify locations of respective checkpointed metadata page locations in the user data area. The stored mapping information will generally include multiple such page location arrays, each including a different set of entries for a corresponding different set of checkpointed metadata pages.

The checkpointed metadata pages in this particular embodiment are generally stored in order of page identifier. Accordingly, page identifiers of the respective checkpointed metadata pages can be inferred from the entry indexes of the page location array. In other embodiments, the entry indexes may comprise respective unique page identifiers for the checkpointed metadata pages. In such an embodiment, the page identifiers of the checkpointed metadata pages are explicitly stored with the respective locations of the checkpointed metadata pages in the page location arrays.

An example of an array location array 400 indexed by a corresponding set of page location array identifiers specifying respective locations of page location arrays in the user data area is shown in FIG. 4. The array location array 400, also denoted as Array Location Array 1, is one of a plurality of "level 1" location arrays that are stored in conjunction with the checkpointing of pages of the metadata into respective locations in the user data area. The array location array 400 includes a plurality of entries relating respective unique page location array identifiers, denoted Array ID 1, Array ID 2, . . . Array ID m, to their respective storage locations in the user data area. The stored mapping information will generally include one or more such array location arrays, each including a different set of entries for a corresponding different set of page location arrays each configured as shown in FIG. 3.

In other embodiments, the array identifiers utilized in FIG. 4 can comprise respective entry indexes, configured in a manner similar to the entry indexes utilized in the page location array 300 of FIG. 3. The term "array identifier" as used herein is intended to be broadly construed so as to encompass an entry index corresponding to storage location information for a particular location array.

As mentioned previously, the mapping information may further comprise one or more higher-level location arrays, at level 2 or above. For example, in an embodiment with multiple level 1 location arrays of the type shown in FIG. 4, there may be a level 2 location array that stores identifiers of each of the level 1 location arrays in association with the respective storage locations of those level 1 location arrays in the user data area. Additional levels of mapping information above these level 2 location arrays may be generated in a similar manner, as will be apparent to those skilled in the art.

It is to be appreciated that the particular location array configurations illustrated in FIGS. 3 and 4 are presented by way of example only, and should not be construed as limiting in any way. Other types of location arrays can be used in other embodiments. Also, the term "array" as used herein is intended to be broadly construed so as to encompass a table or other type of data structure in which entry indexes or other types of entry identifiers can be associated with respective storage locations.

Figure 2:
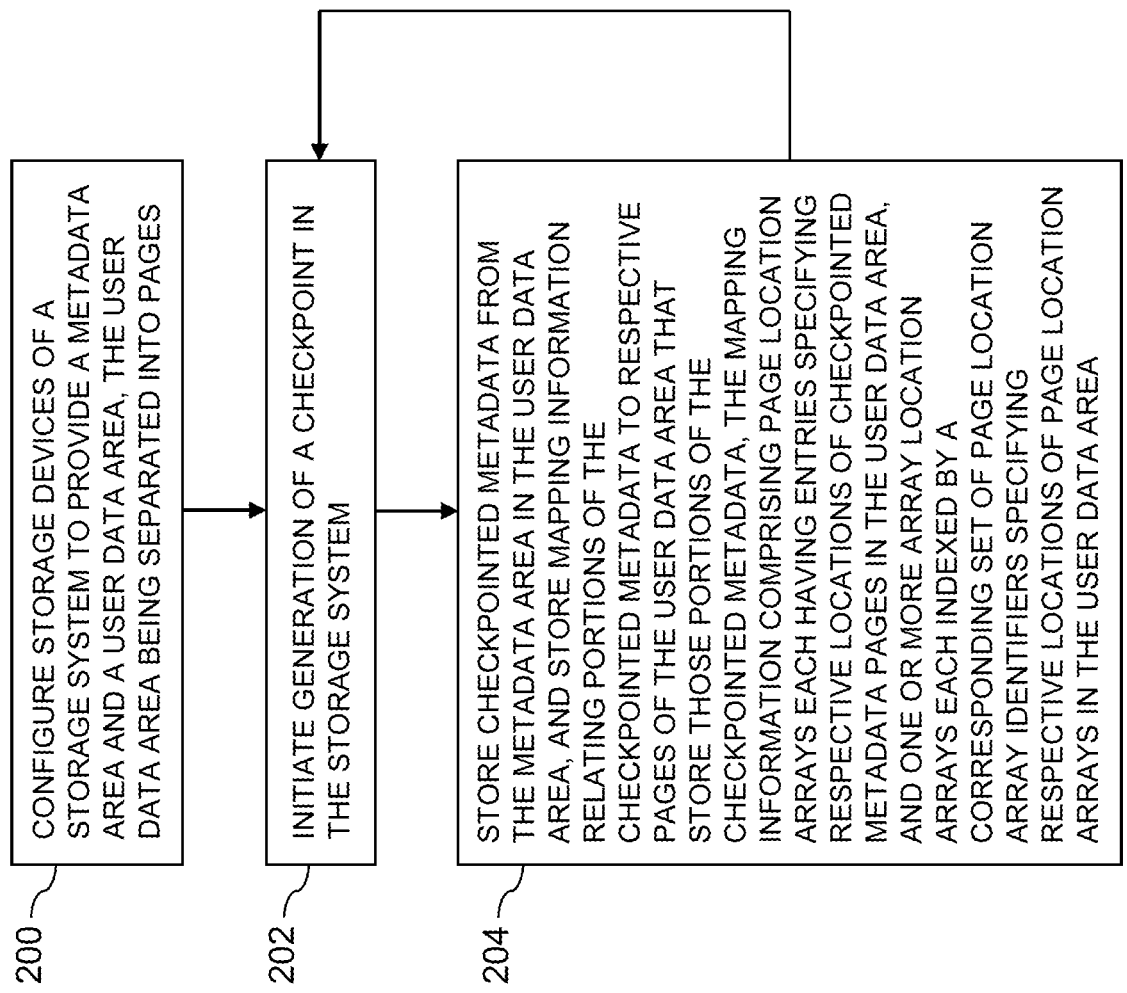
FIG. 2 is a flow diagram of a process for checkpointing metadata into a user data area in conjunction with generation of a checkpoint in a content addressable storage system in an illustrative embodiment.

Steps 202 and 204 of the FIG. 2 process can be repeatedly iterated as needed, as indicated by the feedback arrow from step 204 to step 202 in the figure.

In the context of the FIG. 1 embodiment, the storage controller 108 of content addressable storage system 105 is configured to store mapping information comprising multi-level location arrays 116 characterizing locations of respective pages of checkpointed metadata 114 within the user data area 112. The storage controller 108 in such an embodiment therefore controls performance of at least steps 202 and 204 of the FIG. 2 process.

In conjunction with performance of steps 202 and 204, the storage controller 108 is more particularly configured to scan metadata entries of the metadata area 110, and for each such entry, to identify an associated page identifier. If the page corresponding to the page identifier has not already been checkpointed to the user data area 112, the storage controller 108 determines all metadata entries associated with that page and then checkpoints the page to the user data area 112. It also stores the page location in one of the page location arrays in order of page identifier. These operations are repeated until all metadata entries of the metadata area 110 are checkpointed. Alternatively, only a designated subset of the metadata entries of the metadata area 110 may be checkpointed.

The storage controller 108 is further configured, for a given one of the page location arrays, to store its location and associated page location array identifier in one of the array location arrays in order of page location array identifier. This operation is repeated until all of the page location arrays are indexed in the array location arrays.

In addition, the storage controller 108 is configured, for a given one of the array location arrays, to store its location and an associated array location array identifier in at least one of a checkpoint object for the given checkpoint and a higher-level location array. This operation is also repeated until all of the array location arrays are indexed in at least one of the checkpoint object and the higher-level location array. For example, higher-level location arrays may be stored in the checkpoint object.

The storage controller 108 in the present embodiment also controls the performance of operations associated with recovery of checkpointed metadata. For example, in conjunction with recovery from the checkpoint in the content addressable storage system 105, the storage controller 108 is configured to cause the checkpointed metadata to be retrieved from the user data area 112. This illustratively involves obtaining the locations of the array location arrays from at least one of a checkpoint object for the given checkpoint and a higher-level location array. For a given load request for a particular checkpointed metadata entry, if the particular checkpointed metadata entry has not already been loaded, the storage controller 108 obtains its associated array location array, determines from the array location array the location of its corresponding page location array, determines from the page location array the location of its corresponding page, and loads that page to obtain the particular checkpointed metadata entry. These operations are repeated for one or more additional metadata entries.

As a more particular example of capture and recovery of metadata checkpoints in illustrative embodiments utilizing an implementation of the FIG. 2 process, assume that the metadata to be checkpointed comprises hash metadata (HMD) of a storage system comprising an XtremIO™ storage array. The checkpoint in such an embodiment is illustratively an online system checkpoint that maintains a consistent point in time image of system state characterizing volume configuration, logical volume space and associated physical data storage. In the event that the storage system fails to come up regularly due to a data/metadata inconsistency, the previous state can be easily recovered using the persistent checkpoint image. The HMD in this example is the metadata of the XtremIO™ storage array, and provides a mapping from page digests based on page content to page physical locations. The HMD is assumed to be stored in the metadata area in "buckets," with each such bucket containing multiple 64B cache lines, although other HMD configurations can be used.

It is further assumed that the XtremIO™ storage array is configured in a RAID6 configuration, although other storage redundancy configurations can be used. In such an embodiment, the HMD is checkpointed or "dumped" to the user data area because the metadata area is of limited size and is utilized for other purposes. The user data area in this embodiment is assumed to have no predefined locations for storing such checkpointed metadata, and so the locations of the individual pages of checkpointed metadata within the user data area have to be tracked and stored. The techniques disclosed herein allow this process to occur with much higher efficiency than that achievable using conventional techniques. For example, assuming that the user data area is divided into 8 KB pages, dumping of many GBs of HMD in the user data area will require the storage system to remember millions of individual page locations for the checkpointed metadata. The present embodiment utilizes multi-level location arrays to facilitate the storage and retrieval of the checkpointed metadata.

In this example, the HMD dump algorithm is as follows:

1. Scan all HMD entries by bucket order and then cache line order. For each cache line, find the page ID it belongs to. If the page has not yet been dumped, find all the cache lines and entries belonging to that page and then dump the page. Store the location of the page in an array of page locations using page ID as an index. Repeat for additional pages using one or more additional page location arrays indexed by page ID.

2. Dump each of the page location arrays into one or more 8 KB pages of the user data area and store the location of each such array into an array location array using array ID as an index. Repeat until all of the page location arrays are indexed in an array location array.

3. Store the locations of the array location arrays as part of a checkpoint object in a system memory of the storage system. Additionally or alternatively, the locations of the array location arrays can be stored in one or more higher-level location arrays that are similarly dumped to the user data area. In such an arrangement, the one or more higher-level location arrays can be stored as part of the checkpoint object.

Assuming only two levels of location arrays, the corresponding HMD recovery algorithm is essentially the reverse of the above-described HMD dump algorithm and is as follows:

1. Obtain locations of the array location arrays from the checkpoint object.

2. Await receipt of a load request for an HMD bucket.

3. Upon receipt of a load request for a given HMD bucket, first check if the bucket has been recovered already. If not, determine if the physical location of the bucket is known from a recovered page location array. If not, read the corresponding array location array to determine the location of the appropriate page location array, and then read the appropriate entry in that page location array in order to determine the location of the requested HMD bucket. The requested HMD bucket is then recovered into the metadata area from its determined location in the user data area.

4. Repeat for additional load requests until the complete checkpoint is recovered.

The steps of the HMD dump and recovery algorithms given above are examples only, and can be varied in other embodiments.

It is also to be appreciated that the FIG. 2 process and other metadata checkpointing and recovery features and functionality described above can be adapted for use with other types of information systems, including by way of example an information processing system in which one or more compute nodes and a corresponding storage system are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving checkpointing of metadata in a user data area of a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different checkpoints for respective different portions of a metadata area within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of steps 202 and 204 of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the compute nodes 102 or on storage nodes of the content addressable storage system 105.

Referring now to FIG. 5, another illustrative embodiment is shown. In this embodiment, pseudocode 500 is executed by or under the control of a storage controller of a content addressable storage system. The pseudocode 500 includes a definitions portion 502, an HMD dump algorithm 504 and an HMD recovery algorithm 506.

In this embodiment, three different levels of location arrays are utilized, including level 0 location arrays corresponding to the above-described page location arrays, level 1 location arrays corresponding to the above-described array location arrays, and level 2 location arrays that store locations of respective ones of the array location arrays. The particular number of levels used in a given embodiment can be based on factors such as storage array capacity, and in this embodiment is set to a maximum of three levels on that basis.

As indicated in the definitions portion 502, the page size in the user data area is assumed to be 8 KB, or more particularly 8192 bytes. An offset size of 5 bytes is utilized. Other parameters may be used in other embodiments.

It is to be appreciated that this particular pseudocode shows just one example implementation of a process for storage and recovery of checkpointed metadata, and alternative implementations of the process can be used in other embodiments.

Illustrative embodiments of content addressable storage systems or other types of storage systems with metadata checkpointing functionality as disclosed herein can provide a number of significant advantages relative to conventional arrangements.

For example, some embodiments can advantageously provide significantly improved capture and recovery efficiency for metadata checkpoints in a content addressable storage system or other type of storage system. Such arrangements can overcome the difficulties that would otherwise be associated with checkpointing of metadata in situations in which the checkpointed metadata needs to be stored in a user data area due to size limitations or other availability restrictions relating to a metadata area of the storage system. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102 and content addressable storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
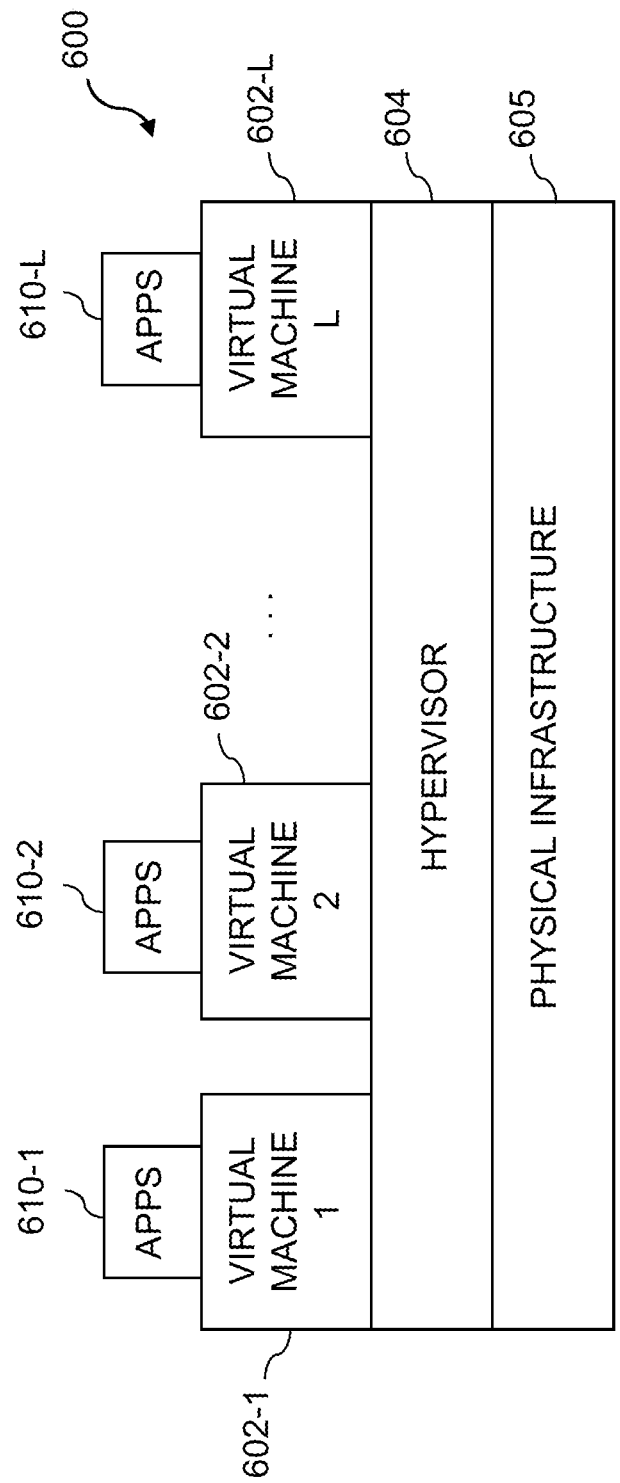
FIGS. 6 and 7 show examples of processing platforms that may be utilized to implement at least a portion of an information processing system in illustrative embodiments.
Figure 7:
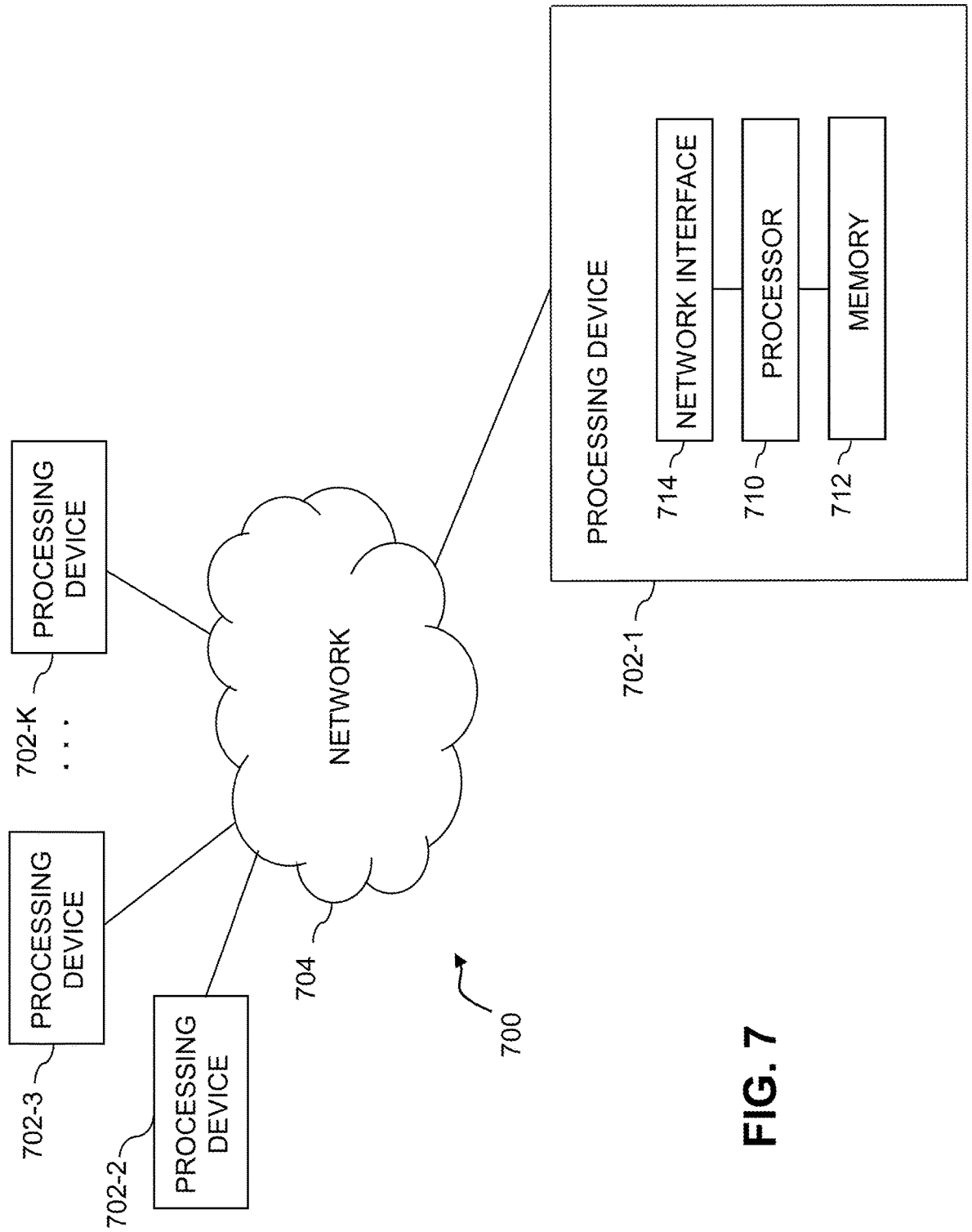

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute nodes 102 and the content addressable storage system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computer systems, compute nodes, storage systems, storage devices, storage controllers, metadata areas, user data areas and multi-level location arrays. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the processing device being configured:
to capture metadata from a metadata area of a storage system for checkpointing; and
to store the captured metadata as checkpointed metadata in a user data area of the storage system in association with mapping information relating portions of the checkpointed metadata to particular storage locations in the user data area;
wherein the mapping information comprises at least one location array; and
wherein said at least one location array comprises a plurality of page location arrays each having a plurality of entries specifying respective locations of checkpointed metadata pages in the user data area.

2. The apparatus of claim 1 wherein the processing device is implemented within the storage system.

3. The apparatus of claim 2 wherein the processing device comprises a storage controller of the storage system.

4. The apparatus of claim 1 wherein the capture of the metadata from the metadata area of the storage system for checkpointing is initiated in conjunction with generation of a corresponding checkpoint in the storage system.

5. The apparatus of claim 1 wherein the mapping information relates portions of the checkpointed metadata to respective pages of the user data area that store those portions of the checkpointed metadata.

6. The apparatus of claim 1 wherein said at least one location array further comprises one or more array location arrays each indexed by a corresponding set of page location array identifiers specifying respective locations of page location arrays in the user data area.

7. The apparatus of claim 6 wherein the mapping information further comprises locations of respective ones of a plurality of the array location arrays in the user data area.

8. The apparatus of claim 7 wherein the locations of the respective ones of the array location arrays are stored in at least one of:
a checkpoint object for a given checkpoint in a system memory of the storage system; and
an additional higher-level location array.

9. The apparatus of claim 1 wherein the storage system comprises a content addressable storage system and wherein the metadata comprises hash metadata providing a mapping between content-based digests of respective pages of the user data and corresponding physical locations of the respective pages of the user data in the user data area.

10. The apparatus of claim 1 wherein the processing device is configured:
to scan metadata entries of the metadata area;
for a given such entry, to identify an associated page identifier;
if the page corresponding to the page identifier has not already been checkpointed to the user data area, to determine all metadata entries associated with that page and to checkpoint the page to the user data area;
to store the page location in one of the page location arrays in order of page identifier; and
to repeat until all metadata entries of the metadata area are checkpointed.

11. The apparatus of claim 6 wherein the processing device is configured:
for a given one of the page location arrays, to store its location and associated page location array identifier in one of the array location arrays in order of page location array identifier; and
to repeat until all of the page location arrays are indexed in the array location arrays.

12. The apparatus of claim 6 wherein the processing device is configured:
for a given one of the array location arrays, to store its location and an associated array location array identifier in at least one of a checkpoint object for a given checkpoint and a higher-level location array; and
to repeat until all of the array location arrays are indexed in at least one of the checkpoint object and the higher-level location array.

13. A method comprising:
capturing metadata from a metadata area of a storage system for checkpointing; and
storing the captured metadata as checkpointed metadata in a user data area of the storage system in association with mapping information relating portions of the checkpointed metadata to particular storage locations in the user data area;
wherein the mapping information comprises at least one location array;
wherein said at least one location array comprises a plurality of page location arrays each having a plurality of entries specifying respective locations of checkpointed metadata pages in the user data area; and
wherein the method is implemented by at least one processing device comprising a processor coupled to a memory.

14. The method of claim 13 wherein the mapping information further comprises one or more array location arrays each indexed by a corresponding set of page location array identifiers specifying respective locations of page location arrays in the user data area.

15. A computer program product comprising a non-transitory processor-readable storage medium having stored therein program code of one or more software programs, wherein the program code when executed by at least one processing device causes said at least one processing device:
to capture metadata from a metadata area of a storage system for checkpointing; and
to store the captured metadata as checkpointed metadata in a user data area of the storage system in association with mapping information relating portions of the checkpointed metadata to particular storage locations in the user data area;
wherein the mapping information comprises at least one location array; and
wherein said at least one location array comprises a plurality of page location arrays each having a plurality of entries specifying respective locations of checkpointed metadata pages in the user data area.

16. The computer program product of claim 15 wherein the mapping information further comprises one or more array location arrays each indexed by a corresponding set of page location array identifiers specifying respective locations of page location arrays in the user data area.

17. The method of claim 14 wherein the mapping information further comprises locations of respective ones of a plurality of the array location arrays in the user data area.

18. The method of claim 17 wherein the locations of the respective ones of the array location arrays are stored in at least one of:
a checkpoint object for a given checkpoint in a system memory of the storage system; and
an additional higher-level location array.

19. The method of claim 13 further comprising:
scanning metadata entries of the metadata area;
for a given such entry, identifying an associated page identifier;
if the page corresponding to the page identifier has not already been checkpointed to the user data area, determining all metadata entries associated with that page and checkpointing the page to the user data area;
storing the page location in one of the page location arrays in order of page identifier; and
repeating until all metadata entries of the metadata area are checkpointed.

20. The method of claim 14 further comprising:
for a given one of the page location arrays, storing its location and associated page location array identifier in one of the array location arrays in order of page location array identifier; and repeating until all of the page location arrays are indexed in the array location arrays.

\* \* \* \* \*